US009577545B2

(12) United States Patent
Tan et al.

(10) Patent No.: US 9,577,545 B2
(45) Date of Patent: Feb. 21, 2017

(54) POWER CIRCUIT, CONVERTER STRUCTURE AND WIND POWER GENERATION SYSTEM THEREOF

(75) Inventors: Jing-Tao Tan, Taoyuan Hsien (TW); Zhi-Jian Zhou, Taoyuan Hsien (TW); Zhi Li, Taoyuan Hsien (TW); Shuo Huang, Taoyuan Hsien (TW); Wei-Xing Liu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 865 days.

(21) Appl. No.: 13/527,044

(22) Filed: Jun. 19, 2012

(65) Prior Publication Data
US 2013/0234522 A1 Sep. 12, 2013

(30) Foreign Application Priority Data

Mar. 9, 2012 (CN) .......................... 2012 1 0061985

(51) Int. Cl.
*H02J 3/00* (2006.01)
*H02M 5/458* (2006.01)
*H02J 3/38* (2006.01)
*H02M 7/487* (2007.01)

(52) U.S. Cl.
CPC ............ *H02M 5/4585* (2013.01); *H02J 3/386* (2013.01); *H02M 7/487* (2013.01); *Y02E 10/763* (2013.01); *Y10T 307/658* (2015.04)

(58) Field of Classification Search
CPC .................. H20P 9/00; H20P 9/04; F03D 9/00
USPC ..................... 307/82; 290/43, 44, 55; 322/44
See application file for complete search history.

(56) References Cited

U.S. PATENT DOCUMENTS

| 5,225,712 | A | * | 7/1993 | Erdman | F03D 7/0272 290/44 |
|---|---|---|---|---|---|
| 5,621,628 | A | * | 4/1997 | Miyazaki et al. | 363/37 |
| 6,072,302 | A | * | 6/2000 | Underwood et al. | 322/17 |
| 6,731,019 | B2 | * | 5/2004 | Burns et al. | 290/42 |
| 7,071,579 | B2 | * | 7/2006 | Erdman et al. | 290/55 |
| 7,239,036 | B2 | * | 7/2007 | D'Atre et al. | 290/44 |
| 7,446,435 | B2 | * | 11/2008 | Zhang | H02M 1/12 307/105 |
| 7,511,385 | B2 | * | 3/2009 | Jones | H02M 5/4585 290/43 |
| 7,852,643 | B2 | * | 12/2010 | Zhang | H02M 1/32 363/65 |
| 8,008,885 | B2 | | 8/2011 | Jones et al. | |

(Continued)

FOREIGN PATENT DOCUMENTS

CN 1885706 12/2006
CN 101316074 12/2008
(Continued)

*Primary Examiner* — Jared Fureman
*Assistant Examiner* — Emmanuel R Dominique
(74) *Attorney, Agent, or Firm* — CKC & Partners Co., Ltd.

(57) ABSTRACT

A power circuit, a converter structure and a wind power generation system thereof are disclosed. The power circuit includes a first converter having an AC input side and a DC output side, a second converter having a DC input side and an AC output side, and a DC bus storage unit electrically connected to the DC output side of the first converter and the DC input side of the second converter. A level number, a switching valve type and/or a circuit connection of the first converter are different from those of the second converter.

21 Claims, 7 Drawing Sheets

(56) References Cited

U.S. PATENT DOCUMENTS

| | | | | |
|---|---|---|---|---|
| 8,848,400 B2* | 9/2014 | Yuan | ........................ | G05F 1/70 323/207 |
| 2005/0206343 A1* | 9/2005 | Ichinose | ................... | H02J 9/08 320/126 |
| 2006/0214645 A1* | 9/2006 | Rufer | ....................... | H02J 3/38 322/28 |
| 2007/0073445 A1* | 3/2007 | Llorente Gonzalez et al. | ........................... | 700/286 |
| 2007/0085344 A1* | 4/2007 | Janssen | .............. | H02M 5/4585 290/44 |
| 2007/0139970 A1* | 6/2007 | Mese | ................... | H02M 7/487 363/13 |
| 2008/0291708 A1* | 11/2008 | Teichmann et al. | ............. | 363/50 |
| 2009/0284079 A1* | 11/2009 | Jahkonen | ....................... | 307/82 |
| 2010/0072824 A1* | 3/2010 | Abolhassani et al. | ......... | 307/82 |
| 2010/0073970 A1* | 3/2010 | Abolhassani et al. | ......... | 363/37 |
| 2010/0141041 A1* | 6/2010 | Bose | .................... | H02M 7/487 307/82 |
| 2010/0142237 A1* | 6/2010 | Yuan | ....................... | H02J 3/386 363/97 |
| 2012/0092908 A1* | 4/2012 | Piotr | ................... | H02M 3/1584 363/71 |
| 2013/0163292 A1* | 6/2013 | Basic | ................. | H02M 5/4585 363/34 |
| 2013/0308351 A1* | 11/2013 | MacLennan | ........... | H02M 1/12 363/34 |

FOREIGN PATENT DOCUMENTS

| | | |
|---|---|---|
| CN | 100483917 | 4/2009 |
| CN | 101640423 | 2/2010 |
| CN | 201528280 | 7/2010 |
| CN | 201937495 | 8/2011 |
| CN | 102496957 | 6/2012 |
| EP | 2 244 367 | 10/2010 |
| TW | 200916655 | 4/2009 |
| TW | M380389 | 5/2010 |
| TW | I346441 | 8/2011 |
| WO | WO 2010/018424 | 2/2010 |

\* cited by examiner

POWER CIRCUIT, CONVERTER STRUCTURE AND WIND POWER GENERATION SYSTEM THEREOF

RELATED APPLICATIONS

This application claims priority to Chinese Application Serial Number 201210061985.X, filed Mar. 9, 2012, which is herein incorporated by reference.

BACKGROUND

Field of Invention

The present disclosure relates to power electronic technology. More particularly, the present disclosure relates to a power circuit and a converter structure capable of two-way energy transmission.

Description of Related Art

With the ever-increasing seriousness of energy-related problems in recent times, the development of new ways in which to generate energy (e.g., wind energy, solar energy, etc.) is attracting the attention of those involved in research and development in various areas. In a power generation system, an AC (alternating current) power outputted by a power generator generally has a frequency and amplitude different from those of an AC electric grid. Thus, the AC power outputted by the power generator is often converted into a DC (direct current) through a converter, and subsequently the DC power is inverted into another AC power which is consistent with the AC electric grid in frequency and phase, so as to connect to the electric grid. In the process of converting the AC power into the DC power and subsequently inverting the DC current into another AC current, electronic components (e.g., power switching valves) are controlled by PWM (pulse-width modulation), and the AC-DC conversion and DC-AC conversion are realized by turning on or off these power switching valves.

In a wind power generation system, for example, a traditional wind power converter generally has two forms, one is a symmetric structure in which the generator-side converter and the grid-side converter both have two levels, and the other is a symmetric structure in which the generator-side converter and the grid-side converter both have three levels. That is, the level number, the switching valve type and the circuit connection of the generator-side converter are the same as those of the grid-side converter. However, although the control scheme of the two-level symmetric structure is simple, when the generator-side converter and the grid-side converter both operate at a lower switching frequency, much sub-harmonic current exists in the output current of the grid-side converter, so that the harmonic content current entering into the electric grid is large. Even when an LCL (inductor-capacitor-inductor) filter structure is used for filtering, the system design becomes complex and even causes more serious harmonic oscillation condition. Furthermore, although the control scheme of the three-level symmetric structure can greatly solve the problem of harmonic current and suppressing EMI (electromagnetic interference), the number of used power components (e.g., insulated gate bipolar transistors) in the main circuit is at least two times larger than that of the two-level structure, so that the construction cost of the system is higher.

In view of the above, many in the industry are endeavoring to find ways in which to design a novel converter structure, which can greatly suppress harmonic current and EMI, reduce the cost of the electric components of a product, reduce the total loss of a wind power generation system and increase energy conversion efficiency.

SUMMARY

In order to solve the above disadvantages of using a conventional converter structure, the present disclosure provides a power circuit and a converter structure which are both based on an asymmetric structure, and a wind power generation system including the converter structure.

An aspect of the present disclosure provides a converter structure including a generator-side converter, a grid-side converter and a DC bus storage unit. The generator-side converter has a DC side and an AC side, and the AC side of the generator-side converter is connected to a power generator. The grid-side converter has a DC side and an AC side, and the AC side of the grid-side converter is connected to an AC electric grid. The DC bus storage unit is electrically connected to the DC side of the generator-side converter and the DC side of the grid-side converter, so as to store a DC voltage. The generator-side converter and the grid-side converter each includes at least one switching valve. The generator-side converter and the grid-side converter are asymmetric in structure. In an embodiment, one of the generator-side converter and the grid-side converter has a two-level structure, and the other has a three-level structure.

In an embodiment, a switching valve type of the generator-side converter is different from that of the grid-side converter.

In another embodiment, a circuit connection of the generator-side converter is different from that of the grid-side converter. Furthermore, the generator-side converter and the grid-side converter are both three-level structures.

Moreover, the converter structure further includes a generator-side control circuit including a power regulator and a current regulator. The power regulator outputs a current instruction signal according to parameters reflecting the current power of the power generator and a preset parameter. The current regulator outputs a PWM (pulse-width modulation) control signal according to a three-phase current signal from the power generator and the current instruction signal. The generator-side control circuit controls the turning on and off of the switching valve of the generator-side converter through the PWM control signal.

In an embodiment, the generator-side control circuit further includes a power comparator. The power comparator is arranged between the power generator and the power regulator, so as to receive parameters reflecting the current power of the power generator and the preset parameter and output a difference value to the power regulator. In another embodiment, the generator-side control circuit further includes a current comparator. The current comparator is arranged between the power regulator and the current regulator, so as to receive the current instruction signal and the three-phase current signal from the power generator, and output a current difference value to the current regulator.

Moreover, the parameters reflecting the current power of the power generator include the power, the rotating speed and the torque of the power generator.

In an embodiment, the converter structure further includes a grid-side control circuit including a voltage regulator and a current regulator. The voltage regulator outputs a current instruction signal according to the DC voltage and a reference voltage. The current regulator outputs a PWM control signal according to a three-phase current signal from the AC electric grid and the current instruction signal. The grid-side control circuit controls the turning on and off of the switching valve of the grid-side converter through the PWM control signal.

In another embodiment, the grid-side control circuit further includes a voltage comparator. The voltage comparator receives the DC voltage and the reference voltage, and outputs a voltage difference value to the voltage regulator. In a further embodiment, the grid-side control circuit further includes a current comparator. The current comparator is arranged between the voltage regulator and the current regulator, so as to receive the current instruction signal and the three-phase current signal from the AC electric grid, and output a current difference value to the current regulator.

In an embodiment, the converter structure further includes a filter arranged between the AC side of the grid-side converter and the AC electric grid.

Another aspect of the present disclosure provides a power circuit capable of two-way energy transmission, which is applicable to a wind power generation system. The power circuit includes a first converter, a second converter and a DC bus storage unit. The first converter has an AC input side and a DC output side, so as to convert an AC power into a DC power. The second converter has a DC input side and an AC output side, so as to convert the DC power into another AC power. The DC bus storage unit is electrically connected to the DC output side of the first converter and the DC input side of the second converter. Each of the first converter and the second converter includes at least one switching valve. A level number, a switching valve type and/or a circuit connection of the first converter are different from those of the second converter.

In an embodiment, one of the first converter and the second converter has a two-level structure, and the other has a three-level structure.

In another embodiment, when the circuit connection of the first converter is different from that of the second converter, the first converter and the second converter both have a three-level structure.

In an embodiment, the power grade of the wind power generation system is between 10 kW and 100 kW.

Furthermore, when energy is transmitted from the wind power generator to the AC electric grid in the wind power generation system, the first converter is electrically connected to the wind power generator, and the second converter is electrically connected to the AC electric grid.

Furthermore, when energy is transmitted from the AC electric grid to the wind power generator in the wind power generation system, the first converter is electrically connected to the AC electric grid, and the second converter is electrically connected to the wind power generator.

A further aspect of the present disclosure provides a wind power generation system including a wind power generator and a converter module. The converter module includes at least one of the above mentioned converter structures.

In an embodiment, the power grade of the wind power generation system is between 10 kW and 100 kW.

In another embodiment, the converter module includes a first converter structure and a second converter structure. The AC side of the generator-side converter of the first converter structure is connected with the AC side of the generator-side converter of the second converter structure in parallel. The AC side of the grid-side converter of the first converter structure is connected with the AC side of the grid-side converter of the second converter structure in parallel. Furthermore, the grid-side converter of the first converter structure is connected to an AC electric grid through a first filter. The grid-side converter of the second converter structure is connected to the AC electric grid through a second filter.

In the power circuit and the converter structure which are both based on an asymmetric structure, and the wind power generation system including the foregoing converter structure, the structure of the power circuit is flexibly designed and optimized by making different the level number, the switching valve type and/or the circuit connection of the first converter and the second converter in the power circuit. Furthermore, when the power circuit is applied to the converter structure of the wind power generation system, the generator-side current and the grid-side current are both sine wave currents, and the harmonic content is smaller. Compared with the two-level symmetric structure or the three-level symmetric structure of the prior arts, the converter structure of the present disclosure can reduce system loss, improve system operation efficiency, significantly suppress harmonic current and EMI (electromagnetic interference), reduce the number of power components used in the converter structure, and reduce cost.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
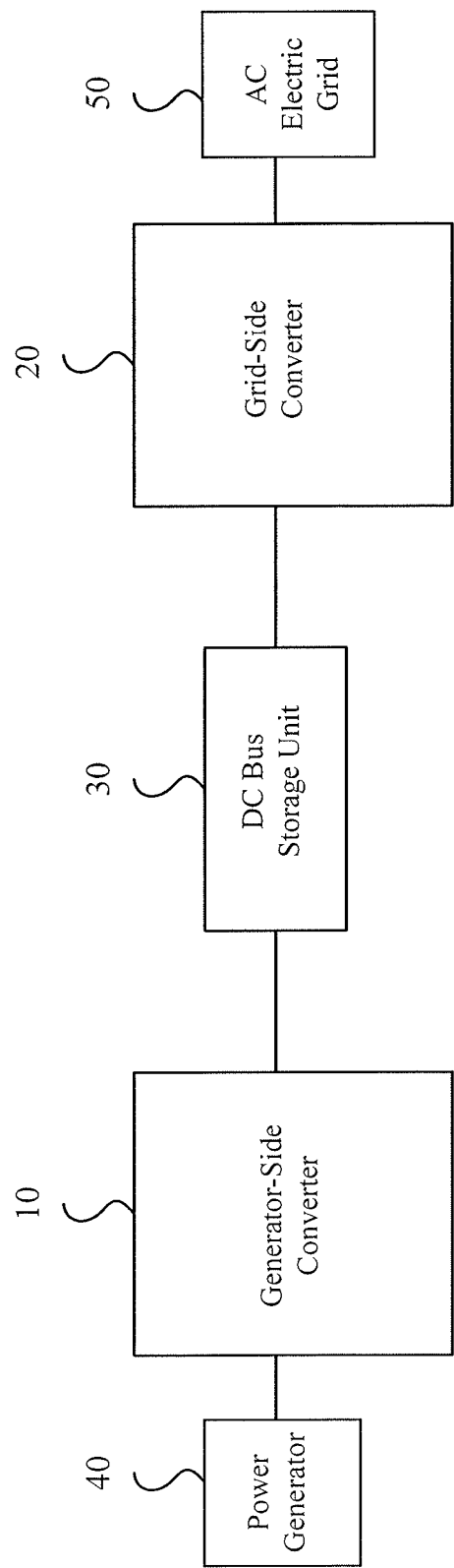
FIG. 1 illustrates a block diagram of a converter structure according to a specific embodiment of the present disclosure.

In order to make the description of the present disclosure more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present disclosure. Moreover, the accompanying drawings are only illustrative and are not made according to the original size.

In the embodiments and the claim of the present disclosure, the description relating to "coupled with" may refer to that a component is indirectly connected to another component through other components, and may also refer to that a component is directly connected to another component without using other components.

In the embodiments and the claim of the present disclosure, the articles "a," "an" and "the" refer to one or more, unless expressly specified otherwise.

As used herein, the terms "about," "approximately," "subsequently" or "near" are used to modify any micro-variable quantity, but these micro-variations do not change the nature of the quantity. In the embodiments the error of the quantity modified by terms "about," "approximately," "subsequently" or "near" is in a range of 20%, preferably in a range of 10%, and more preferably in a range of 5%, unless expressly specified otherwise.

FIG. 1 illustrates a block diagram of a converter structure according to a specific embodiment of the present disclosure. Referring to FIG. 1, the converter structure includes a generator-side converter 10, a grid-side converter 20 and a DC bus storage unit 30. The generator-side converter 10 has a DC side and an AC side, and the AC side of the generator-side converter 10 is connected to a power generator 40. The grid-side converter 20 has a DC side and an AC side, and the AC side of the grid-side converter 20 is connected to an AC electric grid 50. The DC bus storage unit 30 is electrically connected to the DC side of the generator-side converter 10 and the DC side of the grid-side converter 20, so as to store a DC voltage.

It should be pointed out that the converter structure of the present disclosure is different from the converter structure of the prior art. In the converter structure of the present disclosure, the generator-side converter 10 and the grid-side converter 20 are asymmetric. Herein, the term "asymmetric" refers to a level number, a switching valve type and/or withstand voltage, and a circuit connection of the generator-side converter 10 being different from those of the grid-side converter 20, but the present disclosure is not limited in this regard. Those of ordinary skill in the art should understand that these parameters defining the asymmetry between the generator-side converter 10 and the grid-side converter 20 are given only by way of example, and other asymmetry parameters which may exist currently or at a future time between the generator-side converter 10 and the grid-side converter 20 are also applicable to the present disclosure and should be included in the scope of the present disclosure. It is to be understood that the present disclosure also encompasses such parameters with respect to the asymmetry between the generator-side converter 10 and the grid-side converter 20.

In a specific embodiment, the generator-side converter 10 has a two-level structure, and the grid-side converter 20 has a three-level structure. In another specific embodiment, the generator-side converter 10 has a three-level structure, and the grid-side converter 20 has a two-level structure. It should be understood that, when a back-to-back converter for a wind power generation system includes the generator-side converter 10 and the grid-side converter 20, a corresponding level structure can be flexibly selected according to an actual condition of the power generator or the AC electric grid. For example, when the converter structure includes a two-level rectifier/inverter circuit and a three-level rectifier/inverter circuit, the two-level rectifier circuit is used as the generator-side converter 10, and the three-level inverter circuit is used as the grid-side converter 20. Also for example, when the converter structure includes a two-level rectifier/inverter circuit and a three-level rectifier/inverter circuit, the three-level rectifier circuit is used as the generator-side converter 10, and the two-level inverter circuit is used as the grid-side converter 20.

In a further embodiment, the switching valve type of the generator-side converter 10 is different from that of the grid-side converter 20. For example, the switching valve of the generator-side converter 10 may have a higher switching frequency, while the switching valve of the grid-side converter 20 may have a lower switching frequency. Also for example, the switching valve of the generator-side converter 10 may have a higher withstand voltage, while the switching valve of the grid-side converter 20 may have a lower withstand voltage.

Figure 2:
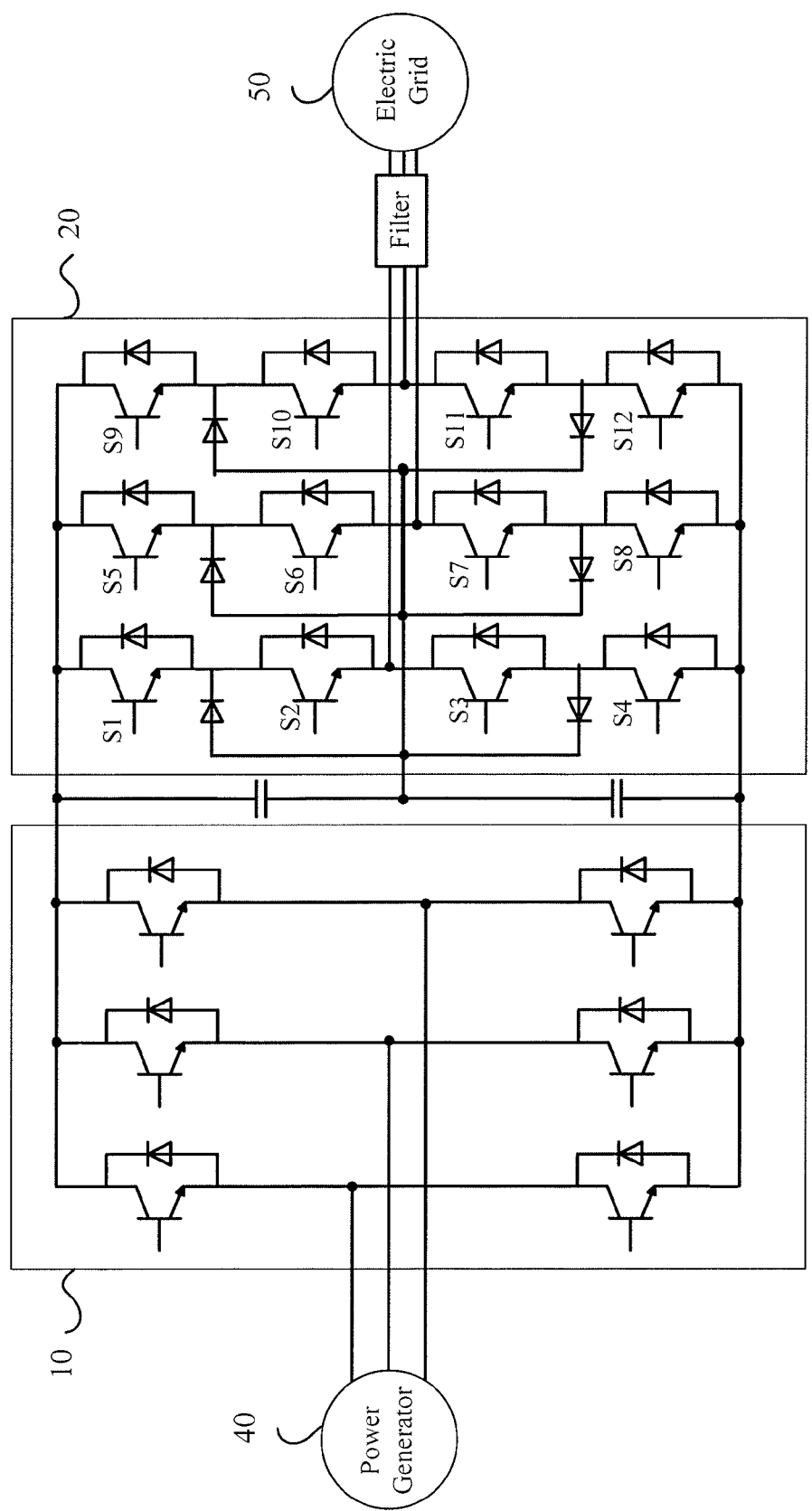
FIG. 2 illustrates a specific embodiment of circuit connections of a generator-side converter and a grid-side converter which have different level structures in the converter structure of FIG. 1.

FIG. 2 illustrates a specific embodiment of circuit connections of the generator-side converter 10 and the grid-side converter 20 which have different level structures in the converter structure of FIG. 1.

Referring to FIG. 2, the generator-side converter 10 and the grid-side converter 20 are asymmetric in level number. Specifically, each bridge arm of the generator-side converter 10 includes two switching valves, such as IGBTs (insulated gate bipolar transistors). The common nodes of the series connected switching valves are respectively electrically connected to the power generator 40. When the power generator 40 transmits energy to the electric grid 50, the generator-side converter 10 is used as a three-phase rectifier bridge, so as to rectify the AC power outputted by the power generator into a DC power. Accordingly, each bridge arm of the grid-side converter 20 includes four switching valves. For example, IGBTs S1-S4 form a first bridge arm, IGBTs S5-S8 form a second bridge arm, and IGBTs S9-S12 form a third bridge arm. When the power generator 40 transmits energy to the electric grid 50, the grid-side converter 20 is used as a three-phase inverter bridge, so as to invert the DC power into an AC power which is consistent with the AC electric grid 50 in amplitude and frequency. If the DC voltage applied on two ends of a DC bus storage unit (e.g., a capacitor) is defined as Udc, the DC input side of the grid-side converter 20 of FIG. 2 has three level forms, i.e., +½Udc, 0 and −½Udc, and thus the grid-side converter 20 may be described as having a three-level structure.

In a specific embodiment, the converter structure further includes a filter. The filter is arranged between the AC side of the grid-side converter 20 and the AC electric grid 50, so as to filter out harmonic content of the AC power.

Referring to FIG. 2 again, in some embodiments, the generator-side converter 10 uses the two-level topology of a three-phase full bridge, and controls the generator-side current to be a sine wave current by a PWM control signal. In general, a power generator has a very large equivalent inductance. For example, a 20 kW power generator generally has an equivalent inductance of 18 mH-40 mH. Therefore, the generator-side converter 10 operates at a lower switching frequency (e.g., 2 kHz to 4 kHz) and obtains a smaller ripple current. Furthermore, switching loss is directly proportional to switching frequency, so that the generator-side converter 10 also has a lower switching loss, thereby increasing the efficiency of the generator-side converter 10. The grid-side converter 20 uses the three-phase full bridge as a three-level structure, and uses a higher switching frequency, so as to reduce the harmonic content and the ripple current in the output current. At the same switching frequency, compared with a traditional grid-side converter having a two-level structure, a grid-side converter having a three-level full bridge structure has a relatively smaller ripple current and a relatively smaller output filter inductance, and thus the grid-side converter 20 and a post-stage filter circuit also have a smaller loss. Therefore, such an asymmetric circuit structure optimizes each switching frequency of the grid-side converter 20 and the generator-side converter 10, and also simplifies the design process of the output filter of the grid-side converter 20, so that it greatly reduces the total loss of a wind power generation system compared with a symmetric two-level converter structure or a symmetric three-level converter structure.

Figure 3:
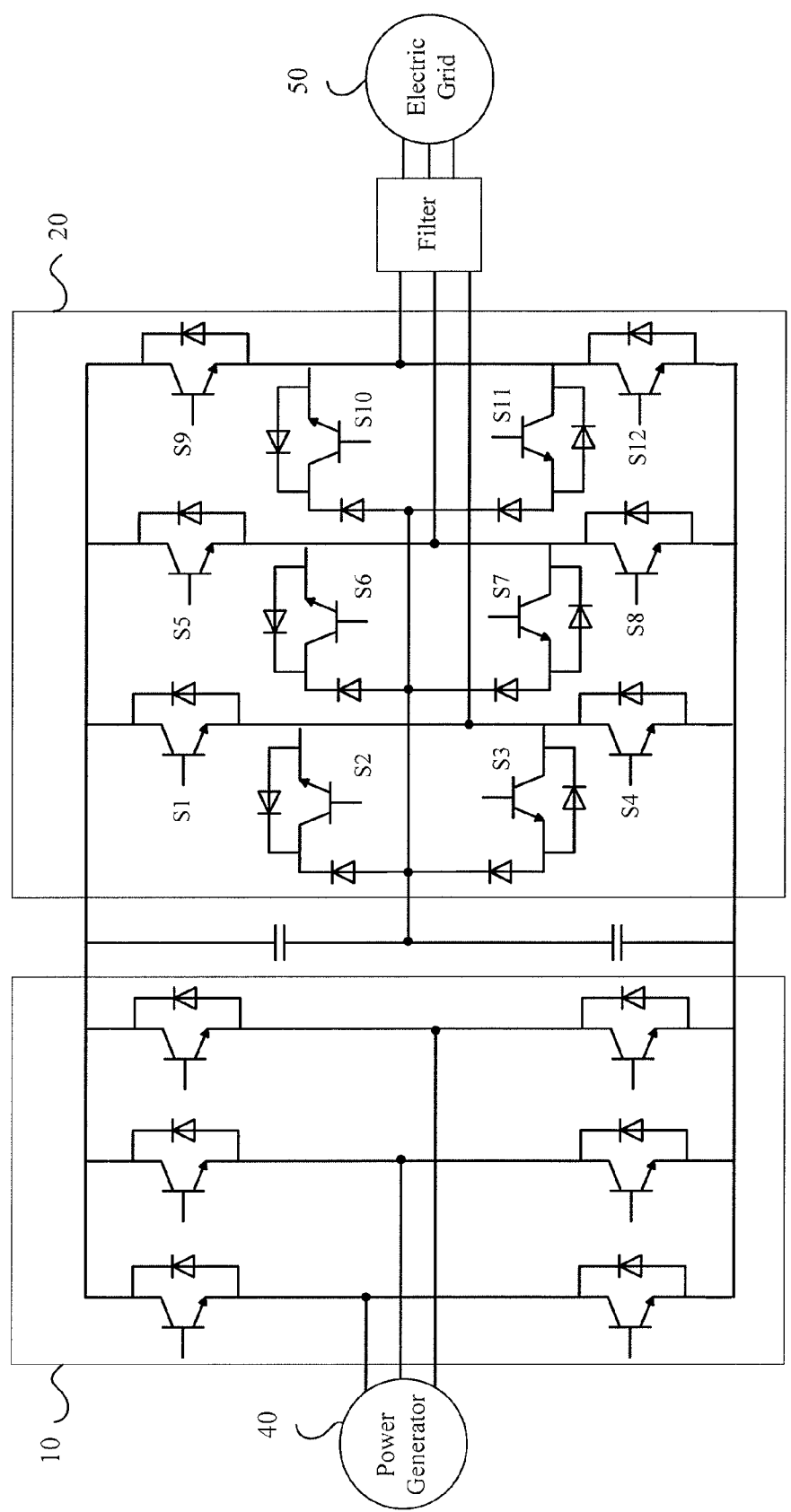
FIG. 3 illustrates a specific embodiment of circuit connections of the generator-side converter and the grid-side converter which have different level structures in the converter structure of FIG. 1.

FIG. 3 illustrates another specific embodiment of circuit connections of the generator-side converter 10 and the grid-side converter 20 which have different level structures in the converter structure of FIG. 1.

Referring to FIG. 3, the generator-side converter 10 and the grid-side converter 20 are asymmetric in level number. Specifically, each bridge arm of the generator-side converter 10 includes two switching valves, such as IGBTs. The common nodes of the series connected switching valves are respectively electrically connected to the power generator 40. Each bridge arm of the grid-side converter 20 includes four switching valves. For example, IGBTs S1-S4 form a first bridge arm, IGBTs S5-S8 form a second bridge arm, and IGBTs S9-S12 form a third bridge arm. If the DC voltage applied on two ends of a DC bus storage unit (e.g., a capacitor) is Udc, the DC input side of the grid-side converter 20 of FIG. 3 has three level forms, i.e., +½Udc, 0 and −½Udc, and thus the grid-side converter 20 can also be described as having a three-level structure. Since the generator-side converter 10 has a two-level structure, the total converter structure is an asymmetric structure.

For a comparison between FIGS. 2 and 3, the grid-side converter 20 of FIG. 2 and the grid-side converter 20 of FIG. 3 both have a three-level structure, the same number of switching valves (both twelve), and operate utilizing the same manner of control. However, due to the difference in circuit connections, during operation of the grid-side converter 20, the main switching valves S1, S4, S5, S8, S9 and S12 of the grid-side converter 20 of FIG. 3 have a withstand voltage that is two times larger than that of the main switching valves S1, S4, S5, S8, S9 and S12 of the grid-side converter 20 of FIG. 2. In general, the higher the withstand voltage, the higher the cost of the power switching valve, so that the circuit structure of the grid-side converter 20 of FIG. 3 is less practical in use than that of the grid-side converter 20 of FIG. 2.

In a specific embodiment, the converter structure further includes a filter arranged between the AC side of the grid-side converter 20 and the AC electric grid 50.

Figure 4:
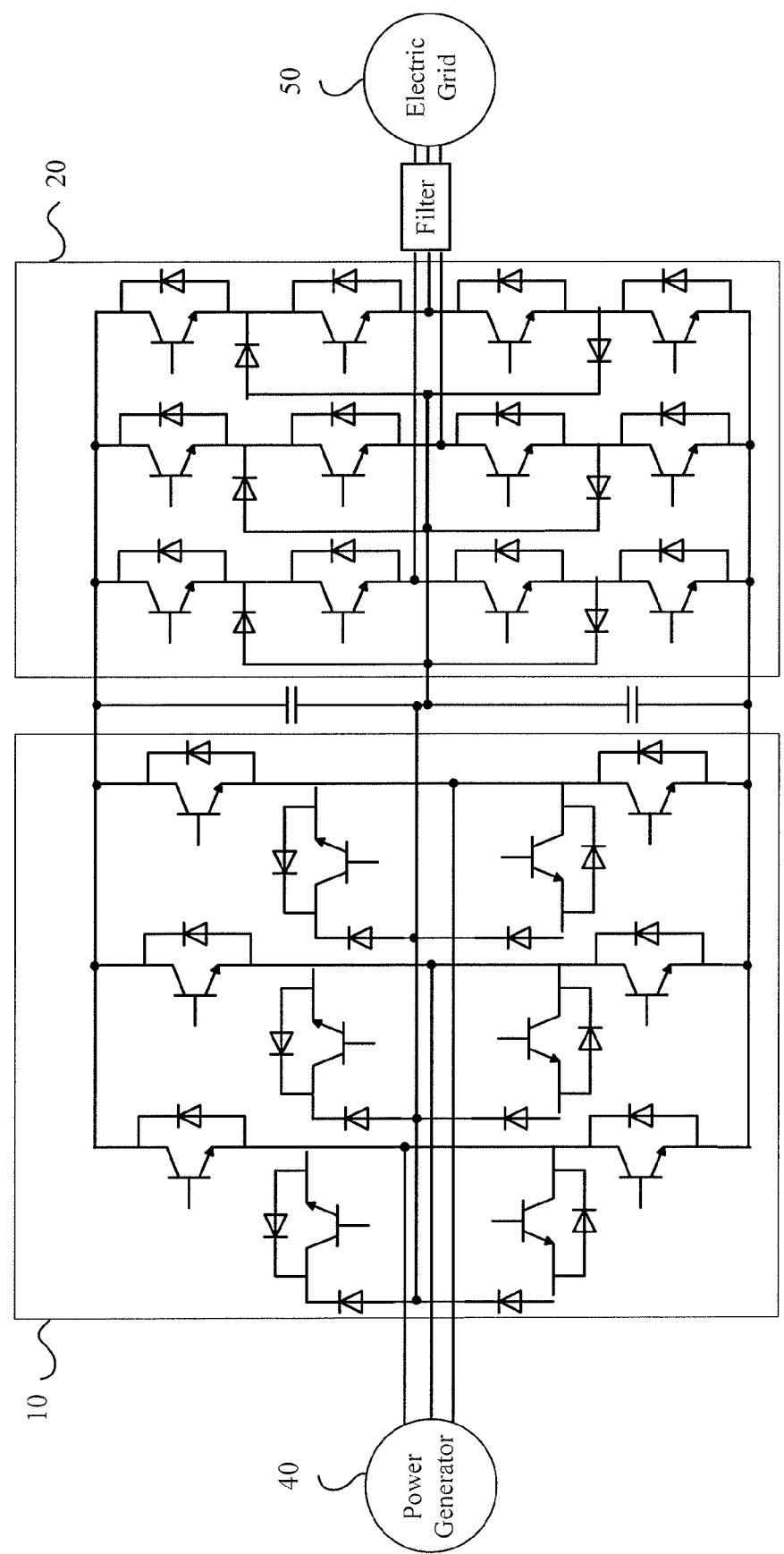
FIG. 4 illustrates a further embodiment of circuit connections of the generator-side converter and the grid-side converter which have different circuit connections in the converter structure of FIG. 1.

FIG. 4 illustrates a further embodiment of circuit connections of the generator-side converter 10 and the grid-side converter 20 which have different circuit connections in the converter structure of FIG. 1.

In FIG. 4, the generator-side converter 10 and the grid-side converter 20 both have a three-level structure. However, the circuit connection of the generator-side converter 10 is different from that of the grid-side converter 20. As shown in FIG. 3, the withstand voltage of some power switching valves of the generator-side converter 10 is different from that of some power switching valves of the grid-side converter 20, so that in the converter structure, the generator-side converter 10 and the grid-side converter 20 are also taken as an exemplary embodiment of the asymmetric structure.

It should be understood that, in some other specific embodiments, when the circuit connection of the generator-side converter 10 is different from that of the grid-side converter 20, the generator-side converter 10 and the grid-side converter 20 either have the same level number (such as both having two levels or both having three levels) or have different level numbers (such as one having two levels and the other having three levels).

Figure 5:
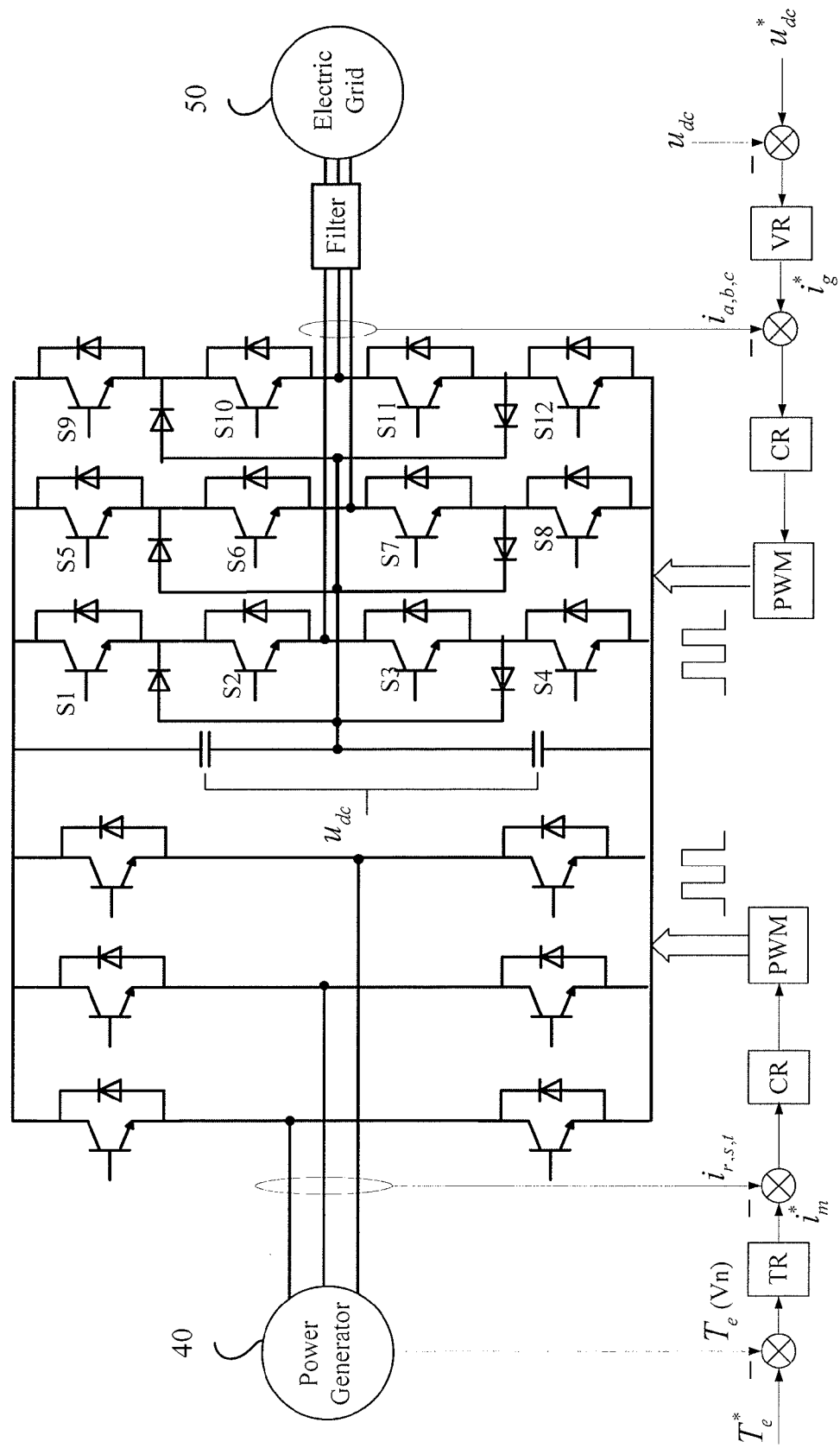
FIG. 5 illustrates a schematic circuit diagram used for describing a configuration to control the generator-side converter and the grid-side converter in the converter structure of FIG. 2.

FIG. 5 illustrates a schematic circuit diagram used for describing a configuration to control the generator-side converter 10 and the grid-side converter 20 in the converter structure of FIG. 2.

Referring to FIG. 5, the converter structure further includes a generator-side control circuit. The generator-side control circuit includes a power regulator TR and a current regulator CR. The power regulator TR outputs a current instruction signal $i^*_m$ according to parameters reflecting the current power of the power generator and a preset parameter. Here, the parameters reflecting the current power of the power generator include the power P, the rotating speed S and the torque T of the power generator. For example, the power regulator TR outputs the current instruction signal $i^*_m$ according to the torque $T_e(Vn)$ of the power generator and a preset torque $T^*_e$. The current regulator CR outputs a PWM control signal according to three-phase current signals $i_r$, $i_s$ and $i_t$ from the power generator 40 and the is current instruction signal $i^*_m$. The generator-side control circuit controls the turning off and on of the power switching valves of the generator-side converter 10 through the PWM control signal.

In a specific embodiment, the generator-side control circuit further includes a power comparator arranged between the power generator 40 and the power regulator TR, so as to receive the parameters reflecting the current power of the power generator and the preset parameter, and output a difference value to the power regulator TR.

In another specific embodiment, the generator-side control circuit further includes a current comparator arranged between the power regulator TR and the current regulator CR, so as to receive the current instruction signal $i^*_m$ and the three-phase current signals $i_r$, $i_s$ and $i_t$ from the power generator 40, and output a current difference value to the current regulator CR.

Referring to FIG. 5, the converter structure further includes a grid-side control circuit. The grid-side control circuit includes a voltage regulator VR and a current regulator CR. The voltage regulator VR outputs a current instruction signal $i^*_g$ according to the DC voltage Udc from the DC bus storage unit 30 and a reference voltage $U^*_{dc}$. The current regulator CR outputs a PWM control signal according to three-phase current signals $i_a$, $i_b$ and $i_c$ from the AC electric grid 50 and the current instruction signal $i^*_g$. The grid-side control circuit controls the turning on and off of the power switching valves of the grid-side converter 20 through the PWM control signal.

In a specific embodiment, the grid-side control circuit further includes a voltage comparator, so as to receive the DC voltage Udc and the reference voltage $U^*_{dc}$, and output a voltage difference value to the voltage regulator VR.

In another specific embodiment, the grid-side control circuit further includes a current comparator arranged between the voltage regulator VR and the current regulator CR, so as to receive the current instruction signal $i^*_g$ and the three-phase current signals $i_a$, $i_b$ and $i_c$ from the AC electric grid 50, and output a current difference value to the current regulator CR.

Furthermore, the converter structure further includes a filter. The filter is arranged between the AC side of the grid-side converter 20 and the AC electric grid 50, so as to filter out harmonic content of the AC current.

Figure 6:
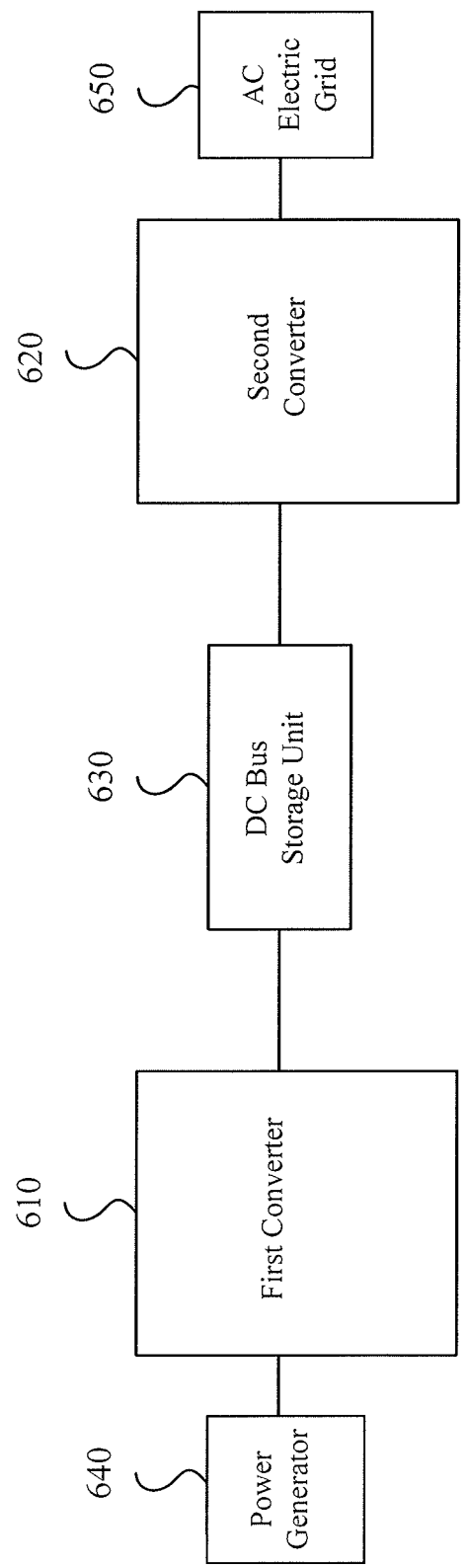
FIG. 6 illustrates a block diagram of a power circuit capable of two-way energy transmission according to still a further specific embodiment of the present disclosure.

FIG. 6 illustrates a block diagram of a power circuit capable of two-way energy transmission according to still a further specific embodiment of the present disclosure.

Referring to FIG. 6, the power circuit capable of two-way energy transmission includes a first converter 610, a second converter 620 and a DC bus storage unit 630. The first converter 610 has an AC input side and a DC output side, so as to convert an AC power into a DC power. The second converter 620 has a DC input side and an AC output side, so as to convert the DC power into another AC power. The DC bus storage unit 630 is electrically connected to the DC output side of the first converter 610 and the DC input side of the second converter 620. Furthermore, the level number, the switching valve type and/or the circuit connection of the first converter 610 are different from those of the second converter 620.

It should be pointed out that, when energy is transmitted from a wind power generator 640 to an AC electric grid 650 in a wind power generation system, the first converter 610 is electrically connected to the wind power generator 640, and the second converter 620 is electrically connected to the AC electric grid 650. However, in some other embodiments, when energy is transmitted from the AC electric grid 650 to the wind power generator 640 in the wind power generation system, the positions of the first converter 610 and the second converter 620 are interchangeable, and the first converter 620 is electrically connected to the AC electric grid 650, and the second converter 610 is electrically connected to the wind power generator 640.

In a specific embodiment, one of the first converter 610 and the second converter 620 has a two-level structure, and the other has a three-level structure.

In another specific embodiment, when the circuit connection of the first converter 610 is different from that of the second converter 620, the first converter 610 and the second converter 620 both have the three-level structure.

Furthermore, when the power circuit capable of two-way energy transmission is applied in the wind power generation system, the power grade of the wind power generation system is between 10 kW and 100 kW.

Figure 7:
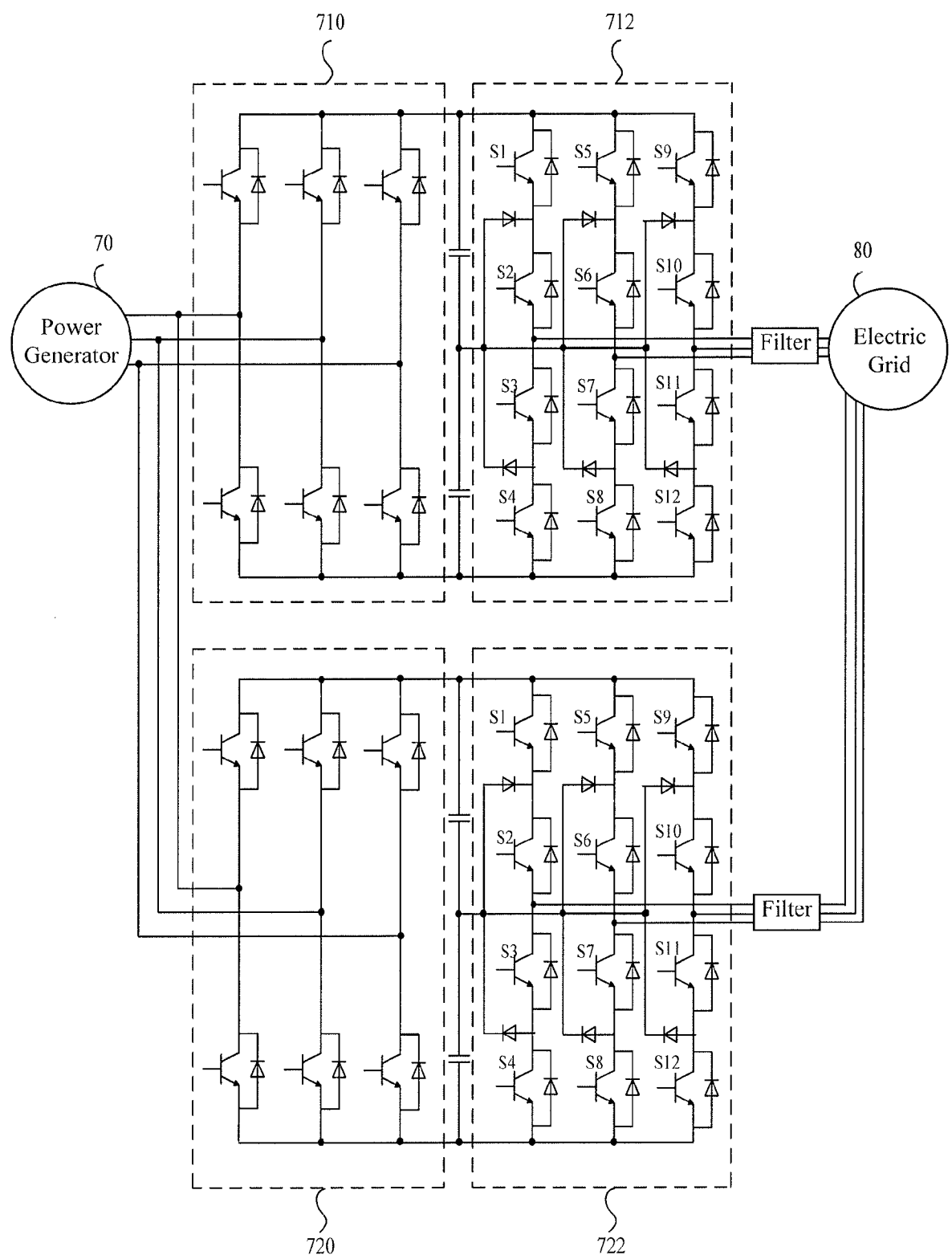
FIG. 7 illustrates a schematic circuit diagram of a parallel topology of the converter structure applied to a wind power generation system according to still yet a further specific embodiment of the present disclosure.

FIG. 7 illustrates a schematic circuit diagram of a parallel topology of the converter structure applied to the wind power generation system according to still yet a further specific embodiment of the present disclosure.

Referring to FIG. 7, the wind power generation system includes a wind power generator 70 and a converter module. The converter module includes a first converter structure and a second converter structure. The first converter structure includes a generator-side converter 710 and a grid-side converter 712. The second converter structure includes a generator-side converter 720 and a grid-side converter 722. The AC side of the generator-side converter 710 is connected in parallel with the AC side of the generator-side converter 720, and the AC side of the grid-side converter 712 is connected in parallel with the AC side of the grid-side converter 722. In some embodiments, the power grade of the wind power generation system is between 10 kW and 100 kW.

It should be understood that in other embodiments, the converter module further includes more than two converter structures. In each converter structure, the AC side of each generator-side converter is connected in parallel with each other, and the AC side of each grid-side converter is also connected in parallel with each other. The converter structure has been described in detail above with reference to FIGS. 2-5, and such a description will not be repeated herein.

In a specific embodiment, the grid-side converter 712 of the first converter structure is connected to the AC electric grid 80 through a first filter, and the grid-side converter 722 of the second converter structure is connected to the AC electric grid 80 through a second filter.

In the power circuit and the converter structure which are both based on an asymmetric structure, and the wind power generation system including the foregoing converter structure, the structure of the power circuit is flexibly designed and optimized by making different the level number, the switching valve type and/or the circuit connection of the first converter and the second converter in the power circuit. Furthermore, when the power circuit is applied to the converter structure of the wind power generation system, the generator-side current and the grid-side current are both sine wave currents, and the harmonic content is smaller. Compared with the two-level symmetric structure or the three-level symmetric structure of the prior arts, the converter structure of the present disclosure can reduce system loss, improve system operation efficiency, significantly suppress harmonic current and EMI, reduce the number of power components used in the converter structure, and reduce cost.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. A converter structure, comprising:
   a generator-side converter having a DC side and an AC side, wherein the AC side of the generator-side converter is connected to a power generator, and the generator-side converter includes at least one switch;
   a grid-side converter having a DC side and an AC side, wherein the AC side of the grid-side converter is connected to an AC electric grid, and the grid-side converter includes at least one switch and has a three-phase structure;
   a generator-side control circuit configured to control turning on and off of the at least one switch of the generator-side converter;
   a grid-side control circuit configured to control turning on and off of the at least one switch of the grid-side converter; and
   a DC bus storage unit electrically connected to the DC side of the generator-side converter and the DC side of the grid-side converter so as to store a DC voltage;
   wherein the generator-side converter has a two-level structure, the grid-side converter has a three-level structure, and a switching frequency of the generator-side converter is lower than a switching frequency of the grid-side converter.

2. The converter structure of claim 1, wherein a switch type of the generator-side converter is different from a switch type of the grid-side converter.

3. The converter structure of claim 1, wherein a circuit connection of the generator-side converter is different from a circuit connection of the grid-side converter.

4. The converter structure of claim 1, wherein the generator-side control circuit comprises:
   a power regulator outputting a current instruction signal according to parameters reflecting the current power of the power generator and a preset parameter; and a current regulator outputting a pulse-width modulation (PWM) control signal according to a three-phase current signal from the power generator and the current instruction signal, wherein the generator-side control circuit controls the turning on and off of the switch of the generator-side converter through the PWM control signal.

5. The converter structure of claim 4, wherein the generator-side control circuit further comprises:

a power comparator arranged between the power generator and the power regulator, so as to receive the parameters reflecting the current power of the power generator and the preset parameter and output a difference value to the power regulator.

6. The converter structure of claim 4, wherein the generator-side control circuit further comprises:

a current comparator arranged between the power regulator and the current regulator, so as to receive the current instruction signal and the three-phase current signal from the power generator, and output a current difference value to the current regulator.

7. The converter structure of claim 4, wherein the parameters reflecting the current power of the power generator comprise a power, a rotating speed and a torque of the power generator.

8. The converter structure of claim 1, wherein the grid-side control circuit comprises:

a voltage regulator outputting a current instruction signal according to the DC voltage and a reference voltage; and a current regulator outputting a pulse-width modulation (PWM) control signal according to a three-phase current signal from the AC electric grid and the current instruction signal, wherein the grid-side control circuit controls the turning on and off of the switch of the grid-side converter through the PWM control signal.

9. The converter structure of claim 8, wherein the grid-side control circuit further comprises:

a voltage comparator receiving the DC voltage and the reference voltage, and outputting a voltage difference value to the voltage regulator.

10. The converter structure of claim 8, wherein the grid-side control circuit further comprises:

a current comparator arranged between the voltage regulator and the current regulator, so as to receive the current instruction signal and the three-phase current signal from the AC electric grid, and output a current difference value to the current regulator.

11. The converter structure of claim 1, further comprising a filter arranged between the AC side of the grid-side converter and the AC electric grid.

12. A power circuit capable of two-way energy transmission and applicable to a wind power generation system, comprising:

a first converter having an AC input side and a DC output side, so as to convert an AC power into a DC power;

a second converter having a DC input side and an AC output side, so as to convert the DC power into another AC power, wherein each of the first converter and the second converter includes at least one switch;

a first control circuit configured to control turning on and off of the at least one switch of the first converter;

a second control circuit configured to control turning on and off of the at least one switch of the second converter; and a DC bus storage unit electrically connected to the DC output side of the first converter and the DC input side of the second converter, wherein a level number, a switch type and/or a circuit connection of the first converter are different from a level number, a switch type and/or a circuit connection of the second converter, wherein the second converter has a three-phase structure, wherein a switching frequency of the first converter is lower than a switching frequency of the second converter.

13. The power circuit of claim 12, wherein one of the first converter and the second converter has a two-level structure, and the other has a three-level structure.

14. The power circuit of claim 12, wherein when the circuit connection of the first converter is different from the circuit connection of the second converter, the first converter and the second converter both have a three-level structure.

15. The power circuit of claim 12, wherein the power grade of the wind power generation system is between 10 kW and 100 kW.

16. The power circuit of claim 12, wherein when energy is transmitted from the wind power generator to the AC electric grid in the wind power generation system, the first converter is electrically connected to the wind power generator, and the second converter is electrically connected to the AC electric grid.

17. The power circuit of claim 12, wherein when energy is transmitted from the AC electric grid to the wind power generator in the wind power generation system, the first converter is electrically connected to the AC electric grid, and the second converter is electrically connected to the wind power generator.

18. A wind power generation system, comprising a wind power generator and a converter module, wherein the converter module comprises at least one converter structure of claim 1.

19. The wind power generation system of claim 18, wherein the power grade of the wind power generation system is between 10 kW and 100 kW.

20. The wind power generation system of claim 18, wherein the converter module comprises a first converter structure and a second converter structure, the AC side of the generator-side converter of the first converter structure is connected in parallel with the AC side of the generator-side converter of the second converter structure, and the AC side of the grid-side converter of the first converter structure is connected in parallel with the AC side of the grid-side converter of the second converter structure.

21. The wind power generation system of claim 20, wherein the grid-side converter of the first converter structure is connected to an AC electric grid through a first filter, and the grid-side converter of the second converter structure is connected to the AC electric grid through a second filter.

* * * * *